United States Patent
Komine et al.

[11] Patent Number: 6,144,677
[45] Date of Patent: Nov. 7, 2000

[54] HIGH AVERAGE POWER FIBER LASER SYSTEM WITH PHASE CONJUGATION

[75] Inventors: Hiroshi Komine; William H. Long, Jr., both of Torrance, Calif.

[73] Assignee: TRW Inc., Redondo Beach, Calif.

[21] Appl. No.: 09/132,618

[22] Filed: Aug. 11, 1998

[51] Int. Cl.[7] .................................................. H01S 3/30
[52] U.S. Cl. ................................................. 372/6; 372/19
[58] Field of Search ............................................. 372/6

[56] References Cited

U.S. PATENT DOCUMENTS

| | | |
|---|---|---|
| 4,681,396 | 7/1987 | Jones . |
| 4,815,079 | 3/1989 | Snitzer et al. . |
| 4,921,335 | 5/1990 | Ditman ..................................... 350/354 |
| 5,087,108 | 2/1992 | Grasso et al. . |
| 5,121,460 | 6/1992 | Tumminelli et al. . |
| 5,218,665 | 6/1993 | Grasso et al. . |
| 5,291,501 | 3/1994 | Hanna . |
| 5,373,576 | 12/1994 | Minns et al. . |
| 5,461,692 | 10/1995 | Nagel . |
| 5,530,709 | 6/1996 | Waarts . |
| 5,555,254 | 9/1996 | Injeyan et al. . |
| 5,566,196 | 10/1996 | Scifres . |
| 5,621,831 | 4/1997 | Staver et al. . |
| 5,636,302 | 6/1997 | Ortiz, Jr. et al. . |
| 5,694,408 | 12/1997 | Bott et al. . |
| 5,790,722 | 8/1998 | Minden et al. . |
| 5,798,853 | 8/1998 | Waranabe ............................ 359/160 |
| 5,959,747 | 9/1999 | Psaltis .................................... 359/22 |

FOREIGN PATENT DOCUMENTS 181386 10/1990 Japan .

*Primary Examiner*—Frank G. Font
*Assistant Examiner*—Gioacchino Inzirillo
*Attorney, Agent, or Firm*—Michael S. Yatsko

[57] ABSTRACT

A relatively high average power optical laser utilizes a diode pumped multi-mode dual-clad fiber amplifier configured for double pass amplification to provide a relatively higher average power than single mode fiber amplifiers. In order to compensate for mode scrambling and depolarization from the multi-mode fiber amplifier, the output beam from the multi-mode fiber amplifier is applied to a vector phase conjugator after a single pass through the amplifier and reflected back into the amplifier. The vector phase conjugator conjugates the electric field amplitude, phase and polarization and reflects a conjugate wave back into the multi-mode fiber amplifier in a reverse direction. The propagation of the conjugate wave through the amplifier unscrambles mode mixing and restores the beam back to its original polarization state. A Faraday rotator and polarization beam splitter are used to outcouple an output beam after the second pass through the multi-mode fiber amplifier.

19 Claims, 2 Drawing Sheets

HIGH AVERAGE POWER FIBER LASER SYSTEM WITH PHASE CONJUGATION

CROSS REFERENCE TO RELATED APPLICATIONS

This application is related to commonly owned copending application High Average Power Fiber Laser System With Phase Front Control, by H. Komine, filed on even date, attorney docket no. 11-0933/63313 and High Average Power Solid State Laser With Phase Front Control, by H. Komine, Ser. No. 09/066063, filed on Apr. 24, 1998.

BACKGROUND OF THE INVENTION

1. Field of the Invention

The present invention relates to a high-average-power fiber laser system which utilizes a multi-mode dual-clad fiber amplifier in order to generate a higher average power which includes compensation for undesirable multiple modes by way of phase conjugation.

2. Description of the Prior Art

High power laser weapon systems are generally known in the art. An example of such a high power laser system is disclosed in commonly owned U.S. Pat. No. 5,198,607. Such laser weapon systems normally include a high power laser weapon and a tracking system for locking the high power laser on a target, such as a ballistic missile, cruise missile, bomber or the like. Such laser weapons are used to destroy or "kill" such targets.

Such laser weapon systems are known to employ relatively large chemical lasers. However, such chemical lasers have several drawbacks. For example, such chemical lasers are relatively bulky and relatively inefficient and require highly reactive chemical fuels. As such, a need has developed to provide relatively efficient compact laser weapons. Although such known fiber laser systems are relatively compact and efficient, such fiber lasers have heretofore had insufficient power output for use in laser weapon systems. More particularly, such fiber lasers are known to include a single mode dual-clad optical fiber. More particularly, the optical fiber includes a core, for example, formed from $SiO_2$ and doped with a rare earth metal, such as, Yb or Nd, Er or other rare earth ions. The doped core is clad by two different cladding layers having different indices of refraction to cause the total internal reflection of the light within the optic fiber to form a single mode fiber. Examples of such optical fibers used for fiber laser are disclosed in U.S. Pat. Nos. 4,815,079; 5,087,108; 5,218,665; 5,291,501; 5,461,692; 5,530,709; and 5,566,196. Such fiber lasers are known to be diode pumped and generate relatively low average power levels, for example, up to 50 watts, which is limited by optically induced damage in the small single-mode core. Unfortunately, such relatively low power levels of fibers lasers have made them unsuitable for some applications including defense applications.

Various attempts have been made to increase the average power output of such fiber lasers. Examples of such attempts are disclosed in U.S. Pat. Nos. 5,121,460 and 5,373,576. Such attempts generally involve the use of relatively complex optical fibers. For example, the '460 patent teaches the use of an optical fiber having a neodymium doped primary core surrounded by a first elliptically shaped multi-mode cladding of fused silica. A samarium doped secondary core is formed around the primary core within the first layer of cladding. The secondary core is utilized for suppressing higher order modes.

The '576 patent also discloses the use of a relatively complex high average power optical fiber. More particularly, the '576 patent discloses an optical fiber formed, with a doped core surrounded by a first multi-mode cladding layer formed from, for example, fused silica. A second cladding layer is formed around the first cladding layer and formed from a cross-link polymeric material having a liquid component. The optical fibers disclosed in the '460 and '576 patents are relatively complex. Thus, there is a need for a relatively high average power fiber laser that utilizes relatively less complex optical fibers than known systems.

SUMMARY OF THE INVENTION

In particular, the present invention relates to a relatively high average power optical laser which utilizes a diode pumped multi-mode dual-clad fiber amplifier, configured for double pass amplification, with a single-mode input beam from an oscillator. In order to compensate for mode scrambling and depolarization of the input beam in the multi-mode fiber amplifier, the amplified beam existing from the multi-mode fiber amplifier after the first pass is coupled to a vector phase conjugator and reflected back into the amplifier. The vector phase conjugator conjugates the electric field amplitude, phase and polarization and reflects the conjugate wave back into the multi-mode fiber amplifier in a reverse direction during the second pass. The conjugated beam unscrambles the mode mixing and restores the polarization to the input polarization state. A Faraday rotator and polarization beam splitter are used to outcouple the output beam from the fiber laser after the second pass through multi-mode fiber amplifier.

DESCRIPTION OF THE DRAWINGS

These and other advantages of the present invention will be readily understood with reference to the following specification and attached drawing wherein.

DETAILED DESCRIPTION

Figure 1:
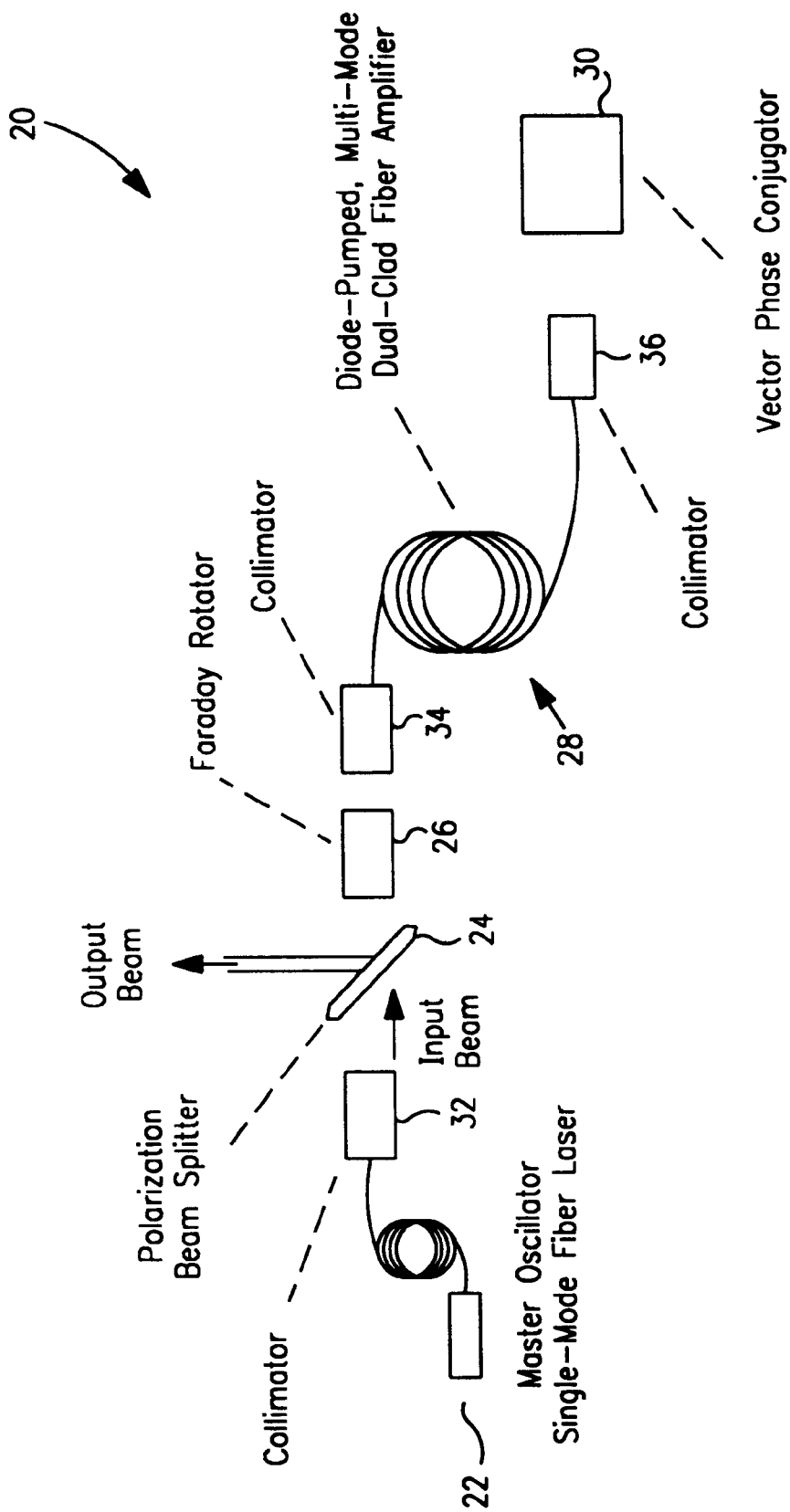
FIG. 1 is a block diagram of the high average power fiber laser system with phase conjugation in accordance with the present invention.

The present invention relates to a high average power fiber laser system as illustrated in FIG. 1 and generally identified with the reference numeral 20. In order to generate higher average power, a multi-mode dual-clad fiber amplifier is utilized. Such multi-mode dual-clad fiber amplifiers are known to generate higher average power than single mode fiber amplifiers because of a larger core diameter. However, such multi-mode amplifiers have not been heretofore known to be used in such fiber lasers due to the relatively poor beam quality and large divergence due to mode scrambling and depolarization. In accordance with the present invention, in order to compensate for mode scrambling and depolarization in the multi-mode dual-clad fiber amplifier, the output beam from the multi-mode amplifier is coupled to a vector phase conjugator which conjugates the incident electric field amplitude, phase and polarization. The conjugated beam is reflected back through the multi-mode amplifier in a second pass which restores the mode and polarization back to the input state. As such, the fiber laser system 20 in accordance with the present invention is adapted to provide relatively higher average power than fiber laser systems which utilize single mode fiber amplifiers, while producing good beam quality and low divergence comparable to those of the single-mode fiber lasers.

The fiber laser system 20 includes a master oscillator 22, a polarization beam splitter 24, a Faraday rotator 26, a diode pumped multi-mode dual-clad fiber amplifier 28, and a plurality of collimators 32, 34 and 36. The master oscillator 22 generates a primary laser signal which may be collimated by the collimators 32 and 34 for applying a relatively low divergence input beam to the multi-mode dual-clad fiber amplifier 28. The multi-mode fiber amplifier 28 amplifies the primary laser signal. The polarization beam splitter 24 and the Faraday rotator 26 act as an optical isolator for passing input beams from the master oscillator 22 to the fiber amplifier 28 and blocking reflection of these beams back to the master oscillator 22. More particularly, input beams generated by the master oscillator 22 are passed through the polarization beam splitter 24 by way of the collimator 32 and directed through the Faraday rotator 26. The output beam from the Faraday rotator 26 is directed to the multi-mode fiber amplifier 28 and the vector phase conjugator 30 by way of the collimators 34 and 36. As will be discussed in more detail below, the vector phase conjugator 30 reflects a portion of the incident light beam from the multi-mode fiber amplifier 28 and back through the multi-mode fiber amplifier 28 in a reverse direction. The Faraday rotator 26 and polarization beam splitter 24 enable this reflected beam to be outcoupled as an output beam 38 while isolating the reflected beam from the master oscillator 22. Other optical isolators may also be used.

An important aspect of the invention relates to the vector phase conjugator 30. As mentioned above, the vector phase conjugator 30 reflects a portion of its input beam back through the multi-mode fiber amplifier 28 forming a double pass configuration. The conjugate wave is reflected back along the same path as the output beam from the multi-mode amplifier in order to compensate for the undesirable effects of the multi-mode amplifier 28, such as mode scrambling and depolarization which normally result in poor beam quality and highly divergent output beam. More particularly, phase conjugation 30 is known to correct for phase errors as well as errors in the optical mode by generating a conjugate signal which is transmitted back along the same optical path as the input signal. By compensating for the undesirable effects of the multi-mode amplifier 28, the fiber laser system 20 is able to provide relatively higher average power fiber laser than heretofore known with single mode fiber lasers.

In general, optical phase conjugation is a process in which the propagation direction and relative phase of the optical signal is reversed so that it exactly retraces its path. Various types of devices are suitable for use as the vector phase conjugator 30. For example, four-wave mixing devices are known to provide vector phase conjugation. Such four-wave mixing devices are discussed in detail in "A Review of the Brillouin Enhanced Four-Wave Mixing", by A. M. Scott, et al., *IEEE Journal of Quantum Electronics*, vol. 25, no. 3, March 1989, pp. 438–459; "Correction of Optical Path Differences Using Phase Conjugation and Single Mode Diode Lasers", by F. G. Patterson and J. C. Brock, *Optics Letters*, vol. 16, no. 17, pp. 13–24, 1991; "Phase Conjugation by Saturable Gain Degenerate Four-Wave Mixing in Solid State Laser Media", by Brignon, et al. *SPIE*, vol. 2771, pp. 64–74, 1996; "Four-Wave Mixing: Applications Both to Fundamental Research and Fulltonics Technology", by Prasad, *SPIE, Critical Reviews*, vol. CR609, pp. 23–42, 1997, all hereby incorporated by reference.

Figure 2:
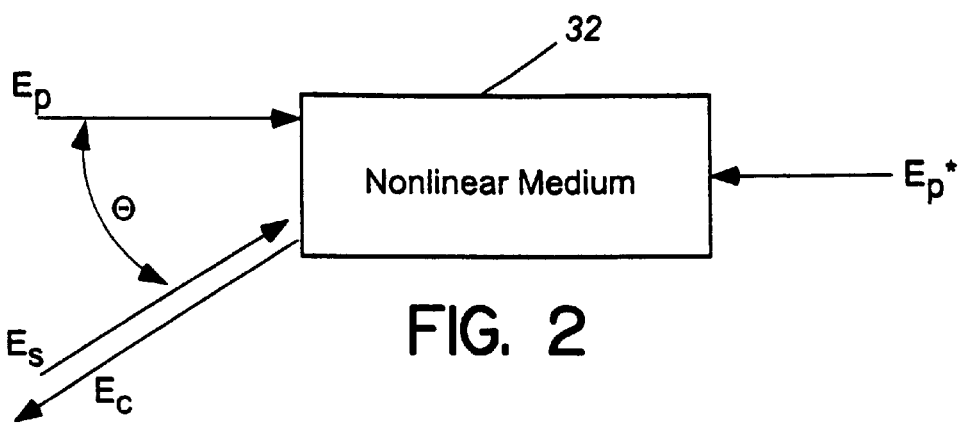
FIG. 2 is a block diagram of a known four-wave mixing device, which may be used to for vector phase conjugation in the block diagram illustrated in FIG. 1.

FIG. 2 illustrates a block diagram of four-wave mixing device 32. As shown, three input waves $E_p$, $E_p$ * and $E_s$ are directed to a medium with a non-linear response. The three input waves are mixed to form a fourth wave $E_c$, which is radiated from the medium with a frequency and direction determined by the frequency and the propagation direction of the input wave $E_s$. As shown in FIG. 2, the waves $E_p$, $E_p$ * are two counter-propagating, plan-wave pumps while the wave $E_s$ is an input wave. As long as the plane-wave pumps $E_p$ and $E_p$ * are phase conjugates of one another, the resulting output wave $E_c$ will be a phase conjugate of the input wave $E_s$.

Figure 3:
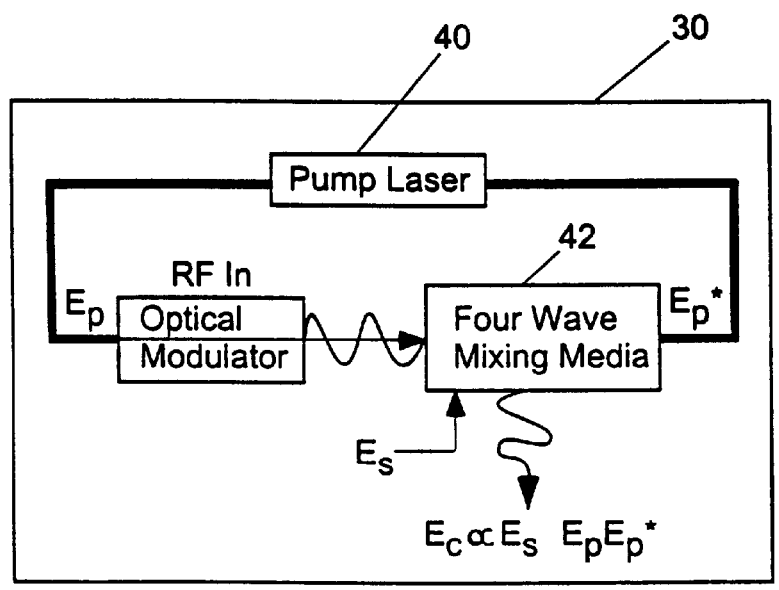
FIG. 3 is an exemplary four-wave mixing device suitable for use with the present invention.

FIG. 3 illustrates an exemplary four-wave mixing device suitable for use as the vector phase conjugator 30. As shown in FIG. 3, the four-wave mixing device 30 includes a pump laser 40 and a four-wave mixing media 42, which may be a non-linear optical device, such as disclosed in; "A Review of Brillouin Enhanced Four-Wave Mixing", supra, hereby incorporated by reference.

Figure 4:
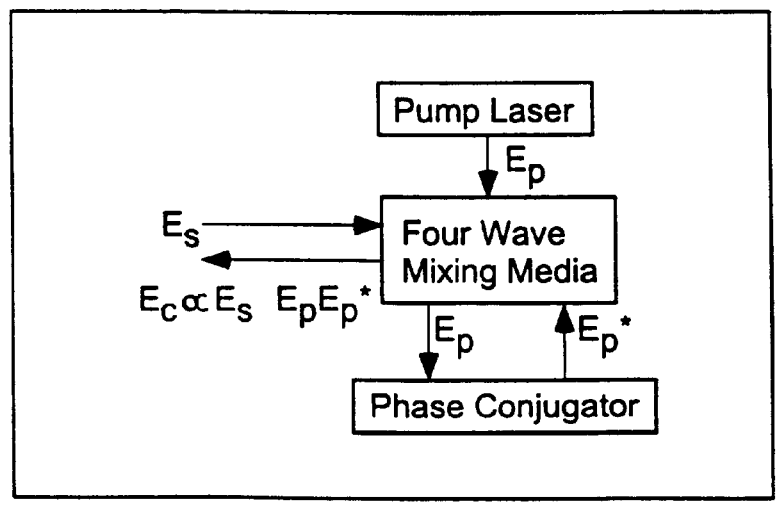
FIG. 4 is an alternative four-wave mixing device suitable for use with the present invention.

The four-wave mixing device 30, illustrated in FIGS. 2, 3, and 4 is merely exemplary. Any device which provides a phase conjugate of the input signal is suitable for use as the vector phase conjugator 30, provided that both polarization components are conjugated in phase. All such devices are considered to be within the broad scope of the invention.

Referring to FIGS. 1 and 3, the output beam from the multi-mode fiber amplifier 28 is collimated by the collimator 36 to provide a relatively low divergence input beams $E_s$. The output beam $E_c$ from the four-wave mixing device 30 is a phase conjugate of the input beam $E_S$ from the multi-mode amplifier 28. The phase conjugate beam $E_C$ propagates backwards along the same optical path as the input beam $E_S$ from the multi-mode fiber amplifier 28. As mentioned above, the propagation of the phase conjugate beam $E_C$ along the same optical path as the $E_S$ from the multi-mode fiber amplifier 28 corrects for phase errors as well as errors in the optical mode of the output beam from the multi-mode fiber amplifier 28. By compensating from such errors, the multi-mode fiber amplifier 28 with a relatively large core diameter can generate a relatively higher power average at the same intensity while maintaining the relatively high beam quality of a single mode fiber.

As compared to a bundle of single-mode fibers with the same total power, the multi-mode fiber amplifier 28 with compensation in accordance with the present invention has relatively lower complexity, weight, volume and cost advantage. There are other advantages in using multi-mode fiber amplifiers. For example, such multi-mode fibers are known to have relatively larger cores than single mode fibers. The larger cores of such multi-mode fibers increases the pump light efficiency in a shorter fiber length making the system relatively more compact. In addition, the pump cladding region in such multi-mode fibers can be made relatively larger than single mode fibers to facilitate pump coupling at the ends of the fiber.

The master oscillator 22 may include from a single mode fiber laser a total reflector and a outcouple mirror. Such single master oscillators are well known in the art. An example of a suitable master oscillator is available as a product, manufactured by IRE POLUS, SDL, and Polaroid Corporation.

The multi-mode fiber amplifier 28 may be a diode-pumped multi-mode dual-clad fiber amplifier. An example of a suitable multi-mode fiber amplifier 28 uses a geometry similar to that used for single-mode dual-clad fiber amplifier, except that the small single-mode core is replaced by a larger core. Such fibers can be made by the same fabrication techniques, but so far they have not been produced commercially as high-power fiber lasers.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

1. A fiber laser system comprising:
    a master oscillator for generating a primary laser signal;
    a multi-mode fiber amplifier for amplifying said primary laser signal, and providing an amplified output signal in a first pass through said amplifier,
    a phase conjugator, coupled to said multi-mode amplifier, for providing a vector conjugate of the amplified output signal, which is reflected back through said multi-mode fiber amplifier defining a reflected conjugate signal in a second pass through said amplifier; and
    an optical isolator for isolating said reflected conjugate signal from said master oscillator, thereby providing an output signal.

2. The fiber laser system as recited in claim 1, wherein said phase conjugator includes a four wave mixing device.

3. The fiber laser system as recited in claim 1, further including one or more first collimators between said master oscillator and said multi-mode fiber amplifier to provide a relatively low divergence input beam to said multi-mode fiber amplifier.

4. The fiber laser system as recited in claim 1, wherein said optical isolator includes a polarization beam splitter and a Faraday rotator.

5. The fiber laser system as recited in claim 1, wherein said master oscillator includes a single-mode fiber laser.

6. The fiber laser system as recited in claim 1, wherein said multi-mode fiber amplifier is diode pumped.

7. The fiber laser system as recited in claim 3, further including one or more second collimators disposed between said multi-mode fiber amplifier and said phase conjugator.

8. The fiber laser system as recited in claim 4, wherein said polarization beam splitter and said Faraday rotator are disposed between said master oscillator and said multi-mode fiber amplifier.

9. A fiber laser system comprising:
    first generating means for generating a primary laser signal;
    means for amplifying said primary laser signal, defining an amplified signal; and
    second generating means for generating a phase conjugate of said amplified signal defining a phase conjugate signal and reflecting said phase conjugate signal back through said amplifying means, said reflected signal forming said output signal.

10. The fiber laser system as recited in claim 9, wherein said amplifying means includes a multi-mode fiber amplifier.

11. The fiber laser system as recited in claim 9, wherein said first generating means includes a master oscillator.

12. The fiber laser system as recited in claim 9, wherein said second generating means includes a four-wave mixing device.

13. The fiber laser system as recited in claim 11, wherein said master oscillator includes a single-mode fiber laser.

14. A method for generating a relatively high average power laser signal, the method comprising the steps of:
    (a) generating a primary laser signal;
    (b) amplifying said primary laser signal with a multi-mode fiber amplifier, defining an amplified signal; and
    (c) phase conjugating said amplified signal forming a conjugated signal and reflecting said conjugated signal back through said multi-mode fiber amplifier.

15. The method as recited in claim 14, wherein said primary laser signal is generated by a master oscillator.

16. The method as recited in claim 14, further including the step of collimating the primary laser signal.

17. The method as recited in claim 14, further including the step of collimating said amplified signal.

18. The method as recited in claim 15, further including the steps of isolating said conjugated signal from said master oscillator.

19. The method as recited in claim 16, wherein said isolating is done by way of polarization beam splitter and a Faraday rotator.

* * * * *